United States Patent
Hamilton et al.

(10) Patent No.: US 12,536,773 B2
(45) Date of Patent: Jan. 27, 2026

(54) SYSTEMS AND METHODS FOR PILL IDENTIFICATION BASED ON IMAGE AND USER CLAIMS DATA

(71) Applicant: Optum, Inc., Minnetonka, MN (US)

(72) Inventors: Laura D. Hamilton, Chicago, IL (US); Vinit Garg, Fremont, CA (US); Ayush Tomar, Morgan Hill, CA (US); Fazle Shahnawaz Muhibul Karim, Chicago, IL (US); Chenwei Liu, Rockville, MD (US)

(73) Assignee: Optum, Inc., Minnetonka, MN (US)

( * ) Notice: Subject to any disclaimer, the term of this patent is extended or adjusted under 35 U.S.C. 154(b) by 434 days.

(21) Appl. No.: 18/343,825

(22) Filed: Jun. 29, 2023

(65) Prior Publication Data
US 2025/0005899 A1  Jan. 2, 2025

(51) Int. Cl.
*G06V 10/764* (2022.01)
*G06V 10/774* (2022.01)
*G16H 10/60* (2018.01)
*G16H 70/40* (2018.01)

(52) U.S. Cl.
CPC ......... *G06V 10/764* (2022.01); *G06V 10/774* (2022.01); *G16H 10/60* (2018.01); *G16H 70/40* (2018.01)

(58) Field of Classification Search
None
See application file for complete search history.

(56) References Cited

U.S. PATENT DOCUMENTS

| | | | |
|---|---|---|---|
| 9,842,257 B2* | 12/2017 | Gershtein | G06V 20/20 |
| 10,297,019 B2* | 5/2019 | Jacobs | G16H 20/10 |
| 2018/0260665 A1* | 9/2018 | Zhang | G06F 18/22 |
| 2022/0358755 A1* | 11/2022 | Gala | G06F 18/24143 |

OTHER PUBLICATIONS

Lester et al., "Performance evaluation of a prescription medication image classification model: an observational cohort," npj Digit. Med. 4, 118 (2021), https://www.nature.com/articles/s41746-021-00483-8.

Oxmermer et al., "VeriMedi: Pill Identification using Proxy-based Deep Metric Learning and Exact Solution," 2021, https://arxiv.org/pdf/2104.11231.pdf.

(Continued)

*Primary Examiner* — Dov Popovici
(74) *Attorney, Agent, or Firm* — Bookoff McAndrews, PLLC

(57) ABSTRACT

Systems and methods for pill identification based on image and user claims data are provided. A pill identification request, including one or more images of a pill and a user identifier of a user associated with the pill, is received. A first machine learning system is used to generate one or more image embeddings based on the one or more images. The user identifier is used to retrieve claims data of the user, and the claims data are encoded to generate a claims embedding. A second machine learning system is used to identify the pill based on the one or more image embeddings and the claims embedding. A response to the pill identification request is generated based on the identifying.

20 Claims, 7 Drawing Sheets

(56) References Cited

OTHER PUBLICATIONS

Prabu S. et al., "Real-Time Pill Detection and Recognition Framework Based on a Deep Learning Algorithm," Advancement, Opportunities, and Practices in Telehealth Technology, 2022, Chapter 7, pp. 117-137, https://www.igi-global.com/chapter/real-time-pill-detection-and-recognition-framework-based-on-a-deep-learning-algorithm/312086.

Tan et al., "Comparison of RetinaNet, SSD, and YOLO v3 for real-time pill identification," BMC Med Inform Decis Mak 21, 324 (2021), https://link.springer.com/article/10.1186/s12911-021-01691-8.

Usuyama et al., "ePillID Dataset: A Low-Shot Fine-Grained Benchmark for Pill Identification," Proceedings of the IEEE/CVF Conference on Computer Vision and Pattern Recognition (CVPR) Workshops, 2020, pp. 910-911, https://arxiv.org/pdf/2005.14288.pdf.

\* cited by examiner

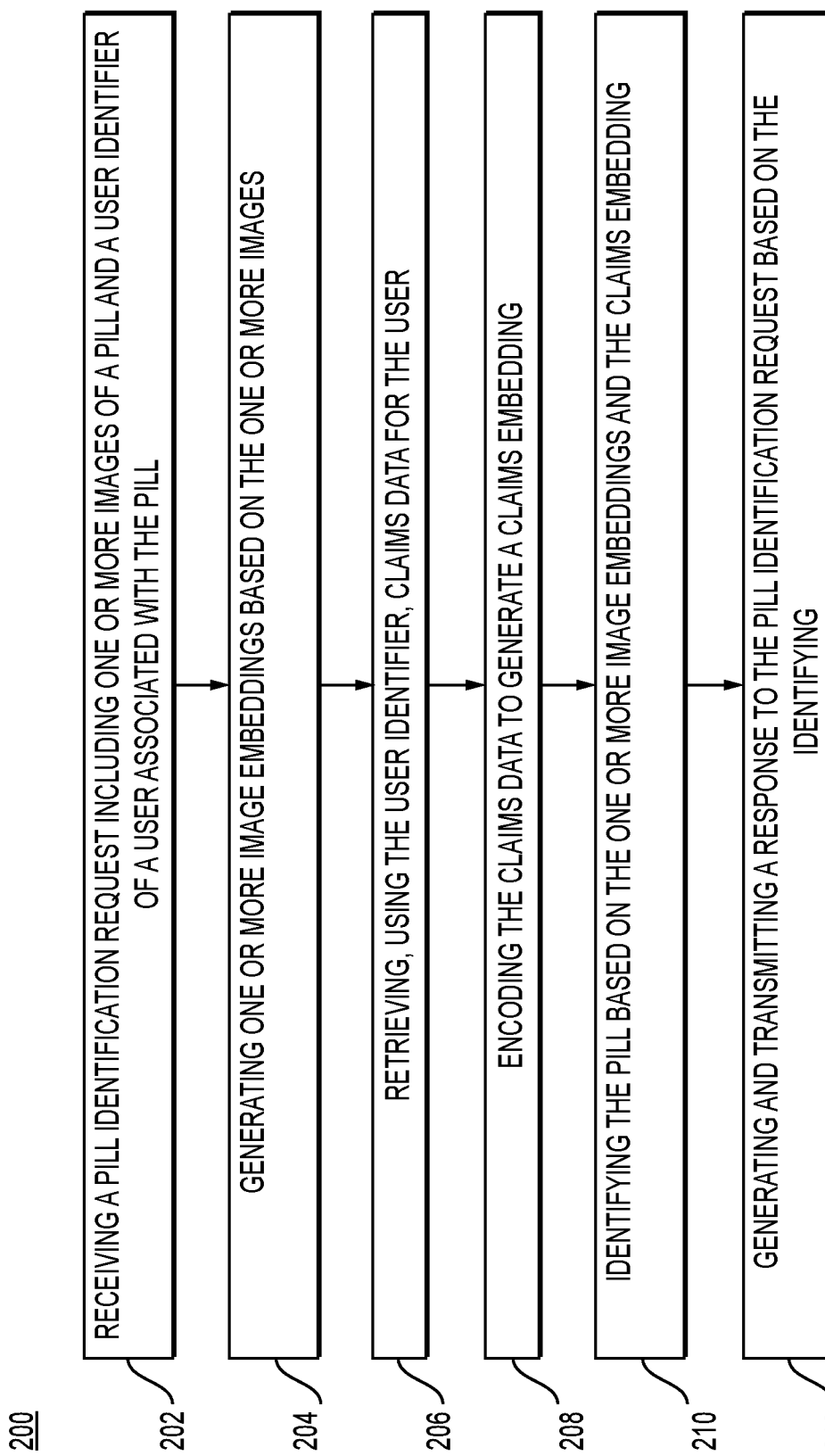

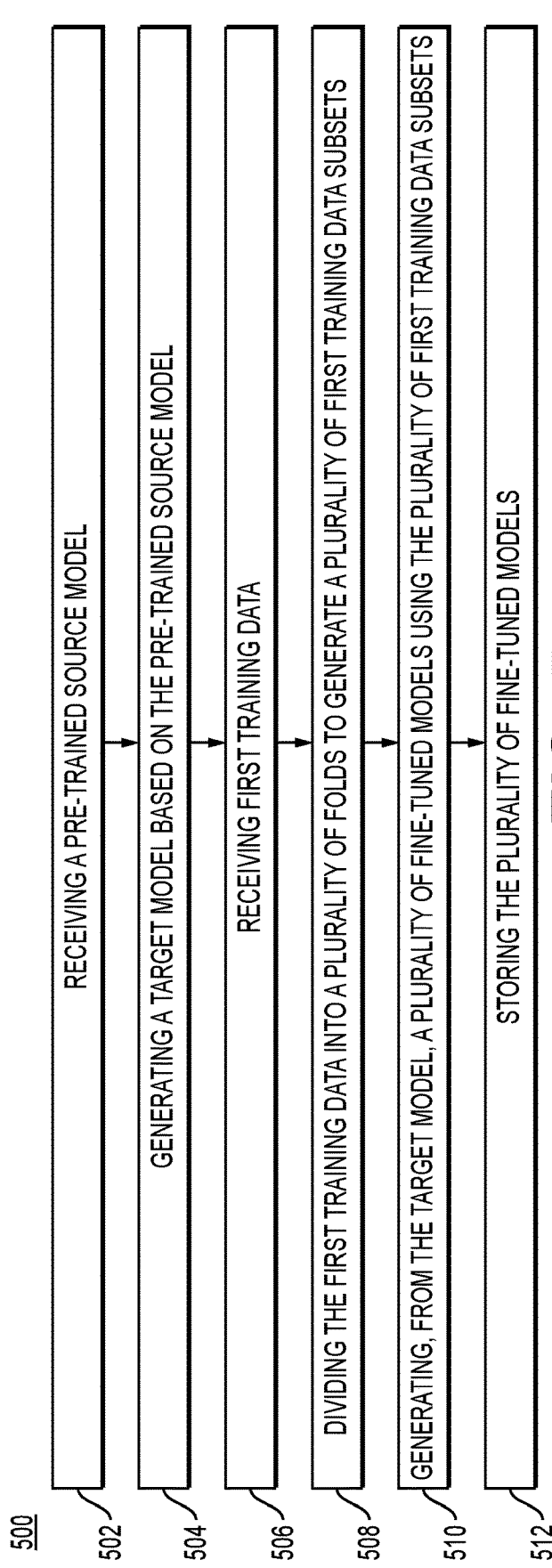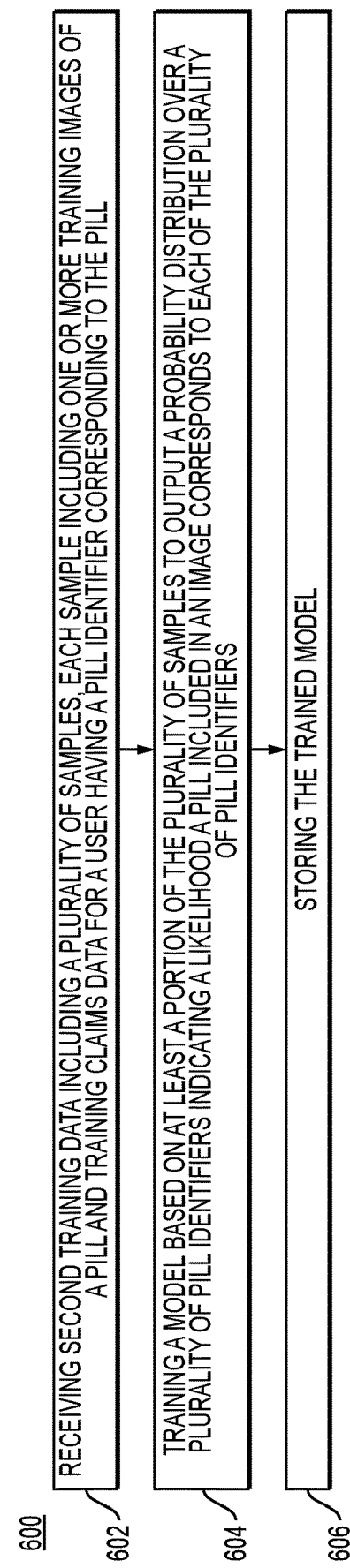
FIG. 5
FIG. 6

SYSTEMS AND METHODS FOR PILL IDENTIFICATION BASED ON IMAGE AND USER CLAIMS DATA

TECHNICAL FIELD

The present disclosure relates generally to systems and methods for processing images to identify pills, and more particularly, to systems and methods for identifying the pills further based on user claims data.

BACKGROUND

Medical professionals and patients alike frequently classify pills based on appearance, which can be difficult as certain pills are confusingly similar in appearance. Conventional machine learning-based image classifiers that are implemented to assist in pill identification typically process images of a pill to identify the pill. However, these conventional classifiers also tend to fail to distinguish or differentiate between pills that are confusingly similar in appearance. Additionally, accuracy of these conventional pill classifiers often depends on the images being of a high resolution with specific lighting, background, and/or angle variations.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

The techniques of this disclosure improve the state of pill identification from pill images by utilizing user claims data in conjunction with the image data to identify pill types.

In some aspects, the techniques described herein relate to a method for identifying pills performed by one or more processors. The method includes: receiving a pill identification request including one or more images of a pill and an identifier of a user associated with the pill; generating one or more image embeddings based on the one or more images; retrieving, using the identifier of the user, claims data for the user; encoding the claims data to generate a claims embedding; identifying the pill based on the one or more image embeddings and the claims embedding; and generating and transmitting a response to the pill identification request based on the identifying.

In other aspects, the techniques described herein relate to a system for pill identification. The system includes one or more processors, and at least one memory storing instructions that, when executed by the one or more processors, cause the one or more processors to perform operations. The operations include: receiving a pill identification request including one or more images of a pill and an identifier of a user associated with the pill; generating one or more image embeddings based on the one or more images; retrieving, using the identifier of the user, claims data for the user; encoding the claims data to generate a claims embedding; identifying the pill based on the one or more image embeddings and the claims embedding; and generating and transmitting a response to the pill identification request based on the identifying.

In further aspects, the techniques described herein relate to a non-transitory computer readable medium for identifying pills. The non-transitory computer readable medium stores instructions which, when executed by one or more processors, cause the one or more processors to perform operations. The operations include: receiving a pill identification request including one or more images of a pill and an identifier of a user associated with the pill; generating one or more image embeddings based on the one or more images; retrieving, using the identifier of the user, claims data for the user; encoding the claims data to generate a claims embedding; identifying the pill based on the one or more image embeddings and the claims embedding; and generating and transmitting a response to the pill identification request based on the identifying.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

FIG. 2 is a flow chart showing an example process for pill identification, according to some embodiments of the disclosure.

FIG. 5 is flow chart showing an example of a process for fine-tuning a plurality of models of a first machine learning system, according to some embodiments of the disclosure.

FIG. 6 is a flow chart showing an example of a process for training a model of a second machine learning system, according to some embodiments of the disclosure.

DETAILED DESCRIPTION

Figure 1:
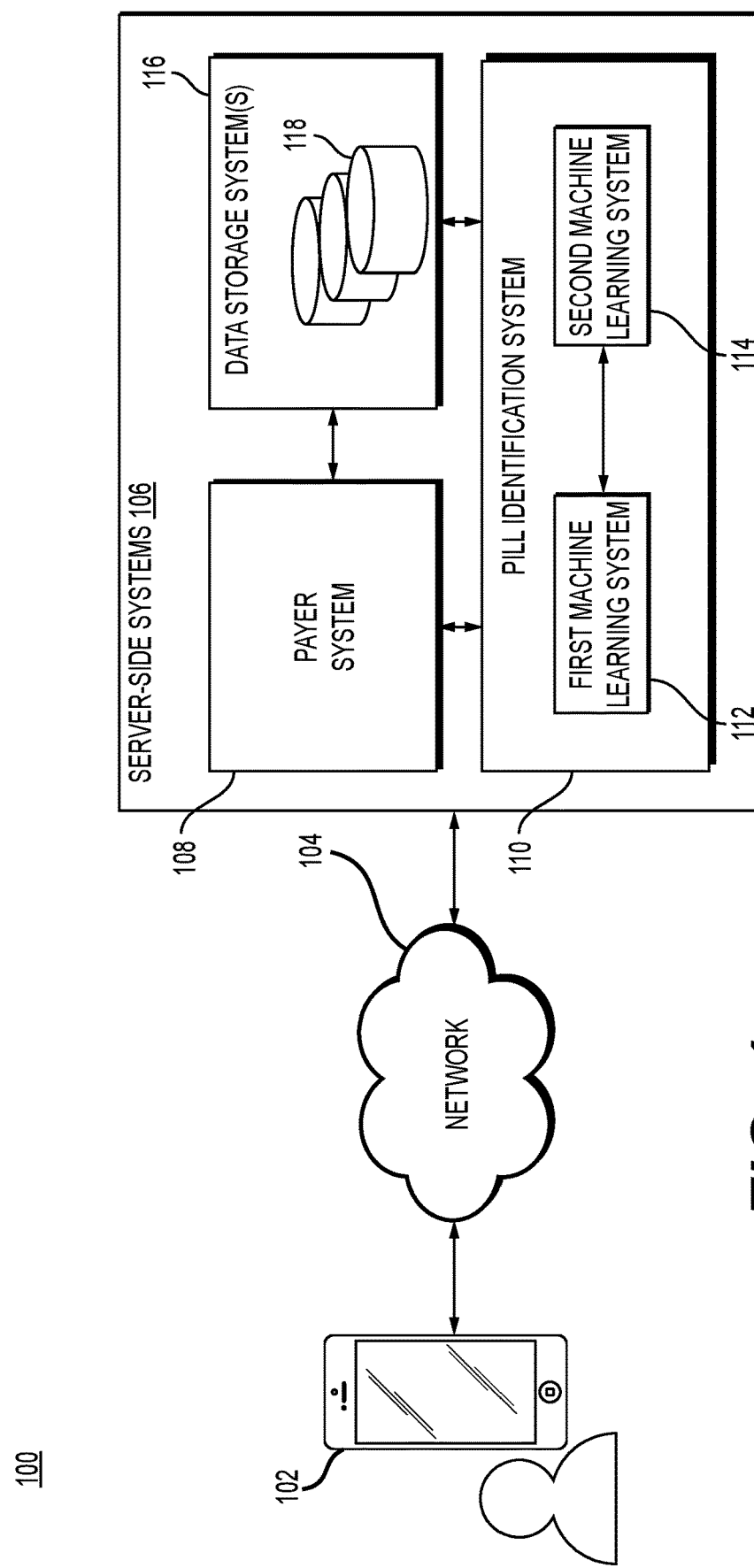
FIG. 1 is a diagram showing an example of an environment for pill identification, according to some embodiments of the disclosure.

As briefly mentioned above, conventional machine-learning based image classifiers implemented for pill identification are configured to process images of a pill to identify the pill. However, these conventional classifiers overall lack robusticity and are error-prone. For example, the conventional pill classifies tend to fail to distinguish or differentiate between pills that are confusingly similar in appearance. Additionally, the accuracy of the conventional pill classifiers is further affected by a quality of the images received for processing. For example, images having a high resolution with specific lighting, background, and/or angle variations are optimal. Otherwise, the conventional classifiers have difficulty capturing small differences in features of the pills, such as imprinted text, particularly in challenging lighting and/or background variations, which is further exacerbated when the pills are coated with shiny material.

The present disclosure solves this problem and/or other problems described above or elsewhere in the present disclosure, namely by improving a state of pill identification from pill images. Specifically, a robust pill identification system is described that employs machine learning-based techniques to integrate tabular claims data of a user that is associated with a pill in conjunction with image data of the pill to identify the pill with improved accuracy. For example, a pill identification request is received that includes one or more images of a pill, such as first and second images of a front and a back of the pill, and a user identifier of the user associated with the pill. A first machine learning system of the pill identification system can generate image embeddings based on the images. Claims data of the user associated with the pill is retrieved using the user identifier included in the request, and is encoded to generate a claims embedding. A second machine learning system of the pill identification system is then used to identify the pill based on the image embeddings and claims embedding.

The claims data can include previous diagnoses, procedures, and/or pharmaceutical claims associated with the user that can further inform (and thus increase an accuracy of) the pill identification process. For example, given a particular diagnosis or procedure, certain types of pills are typically prescribed. Therefore, diagnosis or procedure-related data encoded in the claims embedding can be used in conjunction with image data (e.g., the image embeddings) to help differentiate between likely types of the pills. Similarly, if the user was previously prescribed a type of pill, which can be identified from a previous pharmaceutical claim, the previous prescription can increase a likelihood that the user has been prescribed this type of pill again or another type of pill that is typically prescribed in conjunction with or subsequently to the type of pill. Therefore, the pharmaceutical claims data encoded in the claims embedding can also be used in conjunction with image data to help differentiate.

Additionally, to further increase a robusticity of the pill identification system, as part of the image embedding generation process, the first machine learning system can augment the images received to account for variations in lighting, background, and/or angles of image capture.

While specific examples included throughout the present disclosure involve identification of pills, it should be understood that techniques according to this disclosure may be adapted to other forms of medications or drugs that are uniquely identifiable based on appearance. It should also be understood that the examples above are illustrative only. The techniques and technologies of this disclosure may be adapted to any suitable activity.

Presented below are various aspects of machine learning techniques that can be adapted for processing images to identify pills. As will be discussed in more detail below, the machine learning techniques include one or more aspects according to this disclosure, e.g., a particular selection of training data, a particular training process for a machine learning model, operation of the machine learning model in conjunction with particular data, modification of such particular data by the machine learning model, and/or other aspects that are apparent to one of ordinary skill in the art based on this disclosure.

FIG. 1 is a diagram showing an example of an environment 100 for pill identification, according to some embodiments of the disclosure. A device associated a requesting user (e.g., a requesting user device 102) communicates with one or more other components of the environment 100 across a network 104, including one or more server-side systems 106. The server-side systems 106 include a payer system 108, a pill identification system 110, and/or one or more data storage system(s) 116, among other systems. In some examples, the pill identification system 110 includes a first machine learning system 112 and a second machine learning system 114. The data storage system(s) 116 include one or more data stores 118.

In some examples, the payer system 108, the pill identification system 110, and/or the data storage system(s) 116 are associated with a common entity, e.g., a common payer or health plan provider, such as a health insurance company or the like offering private and/or public health care plans to individuals and/or families, among other health care-adjacent services. In such examples, the payer system 108, the pill identification system 110, and/or the data storage system(s) 116 can be part of a cloud service computer system (e.g., in a data center). That is, the various systems can be components or subsystems of a larger computer system. In other examples, one or more of the payer system 108, the pill identification system 110, and/or the data storage system(s) 116 are separate systems associated with different entities. In such examples, each of the separate systems are communicatively connected to one another over the network 104 (e.g., via an application programming interface (API)). The systems and devices of the environment 100 can communicate in any arrangement. As will be discussed herein, systems and/or devices of the environment 100 communicate in order to perform pill identification.

The requesting user device 102 is configured to enable the requesting user to access and/or interact with other systems in the environment 100. In some examples, the requesting user is a user associated with a pill to be identified (e.g., the user is a patient being prescribed the pill). In other examples, the requesting user is a healthcare professional associated with a pharmacy filling a prescription for the user or a point-of-care healthcare provider treating the user. In further examples, the requesting user is a first responder, such as an emergency medical technician (EMT) or a law enforcement officer. The requesting user device 102 is a computer system such as, for example, a desktop computer, a laptop computer, a tablet, a smart cellular phone, a smart watch, or other wearable computer, etc. The requesting user device 102 includes one or more applications, e.g., a program, plugin, browser extension, etc., installed on a memory of the requesting user device 102. The applications can include one or more of system control software, system monitoring software, software development tools, etc.

In some embodiments, at least one of the applications is associated and configured to communicate with one or more of the other components in the environment 100, such as one or more of the server-side systems 106. For example, the at least one application can be executed on the requesting user device 102 to communicate with the pill identification system 110 directly or indirectly via the payer system 108 to provide a pill identification request over the network 104. The pill identification request includes one or more images of a pill, such as a first image of a front of a pill and/or a second image of a back of a pill, and a user identifier of the user associated with the pill. In some examples, the at least one application is a standalone pill identification application associated with the pill identification system 110. In other examples, the at least one application is a more comprehensive healthcare application associated with the payer system 108, and one of the features or functionalities of the healthcare application is a pill identification feature or functionality. The at least one application can then receive, from the pill identification system 110 and/or the payer system 108, a response to the pill identification request for display on the requesting user device 102. The response includes a type of the pill identified by the pill identification system 110 based on the images and user claims data of the user retrieved from the payer system 108 via the user identifier.

Figure 7:
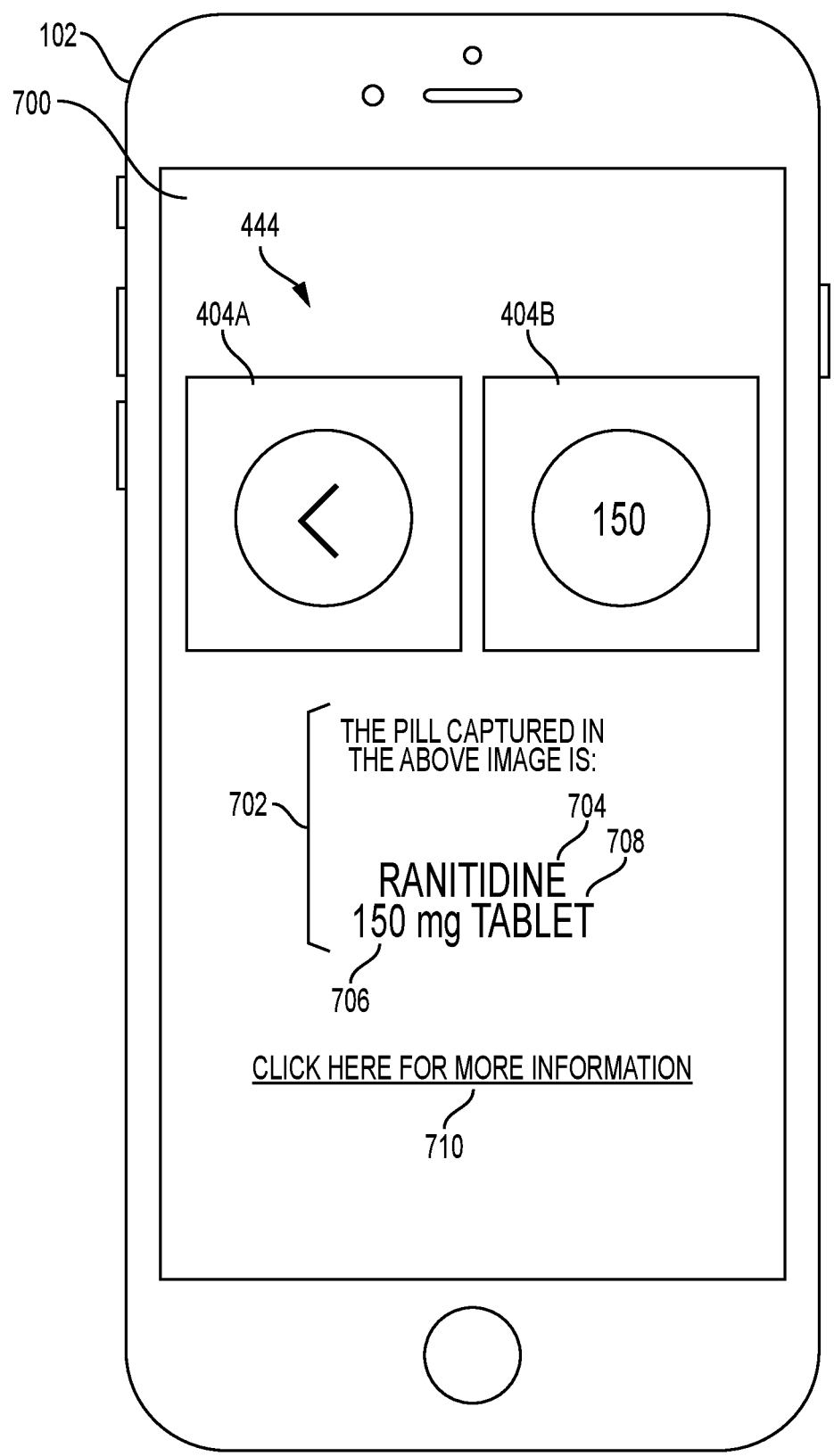
FIG. 7 is an example user interface displaying a response to a pill identification request, according to some embodiments of the disclosure.

Additionally, one or more components of the requesting user device 102, such as the at least one application, generate, or cause to be generated, one or more user interfaces based on instructions/information stored in the memory, instructions/information received from the other systems in the environment 100, and/or the like and cause the user interfaces to be displayed via a display of the requesting user device 102. The user interfaces can be, e.g., mobile application interfaces or browser user interfaces and include text, input text boxes, selection controls, and/or the like. An example user interface including the response to pill identification request is shown in FIG. 7. In some examples, the display includes a touch screen or a display with other input systems (e.g., a mouse, keyboard, etc.) to control the functions of the requesting user device 102.

The payer system 108 includes one or more server devices (or other similar computing devices) for executing services associated with a payer or health plan provider, such as an insurance company or other similar organization. The services can include both user-facing services as well as internal services. One example user-facing service is a pill identification service that can be provided by the payer or a third party described in more detail with reference to the pill identification system 110 below. One example internal service includes receiving and processing claims for a plurality of users having health plans provided by the payer, where claims data associated with the processed claims may be stored in one of the data storage systems 116 described below. The claims data for a given user can include medical claims data and/or pharmaceutical claims data. Previous diagnoses and/or procedures associated with the user can be extracted from one or more claims included in the medical claims data. Additionally, pill identifiers for medications previously prescribed to the user can be extracted from one or more claims included in the pharmaceutical claims data. In some examples, the pill identifiers are national drug codes, hereinafter referred to as NDC codes.

In some examples, the pill identification system 110 is a system of (e.g., is hosted by) the same payer or health plan provider associated with the payer system 108. In such examples, the pill identification system 110 can be a sub-system or component of the payer system 108. In other examples, the pill identification system 110 is a system of (e.g., is hosted by) a third party that provides pill identification services to the payer or health plan provider associated with the payer system 108.

The first machine learning system 112 of the pill identification system 110 includes one or more server devices (or other similar computing devices) for generating image embeddings from images received as part of pill identification requests using a plurality of fine-tuned models. As described in detail elsewhere herein, example image embedding generation from an image includes augmenting the image, generating a plurality of image embeddings based on the augmented image using the plurality of fine-tuned models, averaging the image embeddings, and providing the averaged image embedding as input to one or more other processes. For example, the averaged image embedding can be provided to the second machine learning system 114 for further processing.

The second machine learning system 114 includes one or more server devices (or other similar computing devices) for executing pill identification processes using image embeddings generated by the first machine learning system and claims data. As described elsewhere herein, example pill identification processes include one or more of: retrieving claims data for the user associated with the pill using the user identifier included in the pill identification request, encoding the claims data to generate a claims embedding, receiving image embeddings from the first machine learning system 112 generated from the images included in the pill identification request, concatenating the image embeddings and claims embedding, identifying the pill based on the concatenated embedding using a trained model of the second machine learning system 114, and/or generating a response to the pill identification request based on the identifying. The type of the pill may be provided as input to one or more other processes.

The data storage system(s) 116 each include a server system or computer-readable memory such as a hard drive, flash drive, disk, etc. The data stores 118 of the data storage system(s) 116 include and/or act as a repository or source for various types of health plan- and/or healthcare-related data associated with each of the plurality of users having health plans provided by the payer. For example, each of the data stores 118 can store one or more types of the health plan-and/or healthcare-related data associated with each of the plurality of users enrolled in the plan. Example data types includes, claims data, among other similar data types. As a claim for a user is received and processed by the payer system 108, claims data associated with the claim is stored in association with a user identifier for the given user, and is associated with a time (e.g., a date) of the claim. Additionally, at least one of the data stores 118 stores one or more trained or fine-tuned models that are retrieved and executed by the first machine learning system 112 and/or the second machine learning system 114 of the pill identification system 110 to facilitate targeted medical document review.

In some examples, one of the data storage system(s) 116 maintains each of the data stores 118. In other examples, one or more of the data stores 118 are maintained across two or more different ones of the data storage system(s) 116. One or more of the data storage system(s) 116 can be a system of (e.g., hosted by) the same payer or health plan provider associated with the payer system 108 and/or pill identification system 110. Additionally or alternatively, one or more of the data storage system(s) 116 are associated with a third party that provides data storage services to the payer system 108 and/or pill identification system 110.

The network 104 over which the one or more components of the environment 100 communicate includes one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" means connecting to or accessing source data or information from a location remote from other devices or networks coupled to the Internet. Alternatively, "online" refers to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The requesting user device 102 and one or more of the server-side systems 106 are connected via the network 104, using one or more standard communication protocols. The requesting user device 102 and the one or more of the server-side systems 106 transmit and receive communications from each other across the network 104.

Although depicted as separate components in FIG. 1, it should be understood that a component or portion of a component in the system of the environment 100 is, in some embodiments, integrated with or incorporated into one or more other components. As one example, the first machine learning system 112 and second machine learning system 114 can be integrated into a single component or sub-system of the pill identification system 110. As another example, the pill identification system 110 and/or one or more of the data storage system(s) 116 can be integrated with the payer system 108 or the like. In some embodiments, operations or aspects of one or more of the components discussed above are distributed amongst one or more other components. Any suitable arrangement and/or integration of the various systems and devices of the environment 100 can be used.

In the following disclosure, various acts are described as performed or executed by a component from FIG. 1, such as the requesting user device 102 or one or more of the server-side systems 106, or components thereof. However, it should be understood that in various aspects, various components of the environment 100 discussed above execute instructions or perform acts including the acts discussed below. An act performed by a device is considered to be performed by a processor, actuator, or the like associated with that device. Further, it should be understood that in various embodiments, various steps can be added, omitted, and/or rearranged in any suitable manner.

Figure 3A:
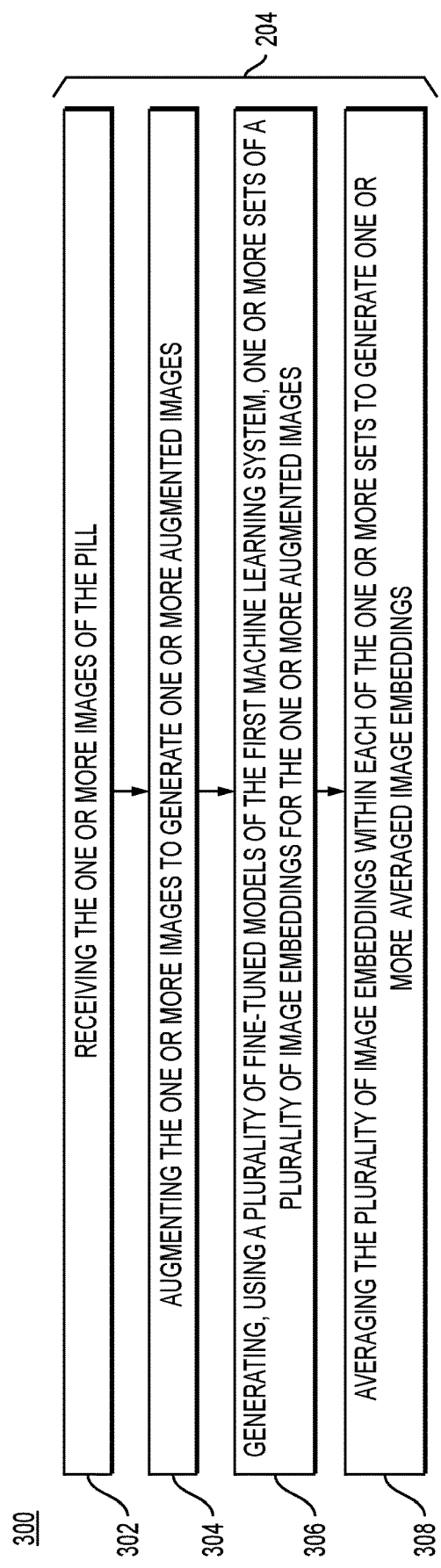
FIG. 3A is a flow chart showing an example process for generating image embeddings performed as part of the process of FIG. 2, according to some embodiments of the disclosure.
Figure 3B:
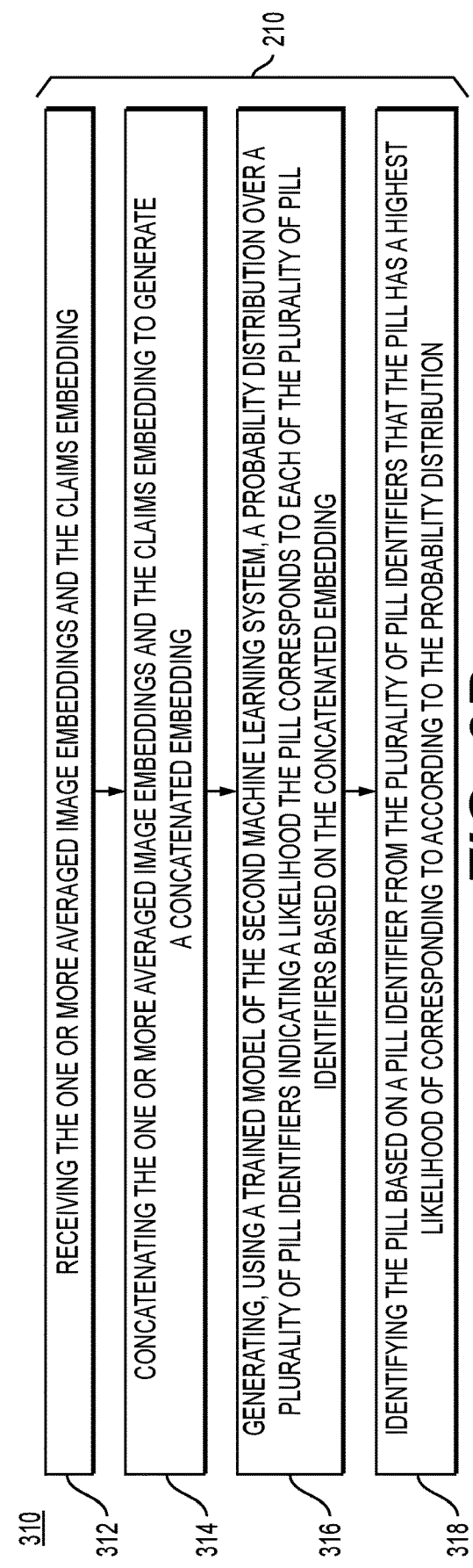
FIG. 3B is a flow chart showing an example process for identifying types of pills performed as part of the process of FIG. 2, according to some embodiments of the disclosure.
Figure 4:
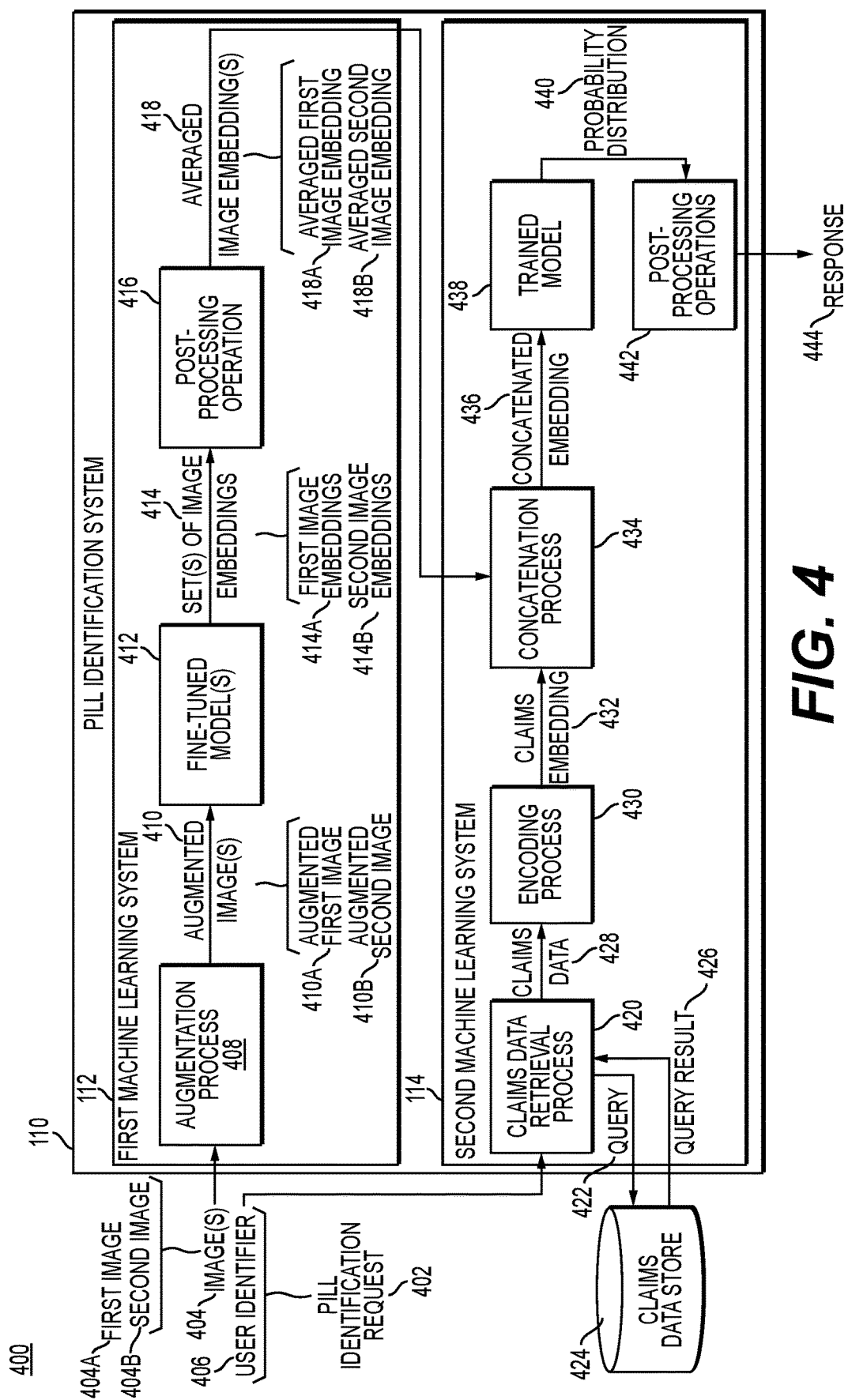
FIG. 4 is a system flow diagram conceptually showing the process of FIG. 2 performed by one or more components of the environment of FIG. 1, according to some embodiments of the disclosure.

FIG. 2 is a flow chart showing an example process 200 for pill identification, according to some embodiments of the disclosure. FIG. 3A is a flow chart showing an example process 300 for generating image embeddings performed as part of the process 200 of FIG. 2, according to some embodiments of the disclosure. FIG. 3B is a flow chart showing an example process 310 for identifying types of pills as part of the process 200 of FIG. 2, according to some embodiments of the disclosure. FIG. 4 is a system flow diagram 400 conceptually showing the process 200 of FIG. 2 performed by one or more components of the environment of FIG. 1, according to some embodiments of the disclosure. Referring concurrently to FIGS. 2-4, in some examples, the process 200 is performed by the pill identification system 110, including the first machine learning system 112 and/or the second machine learning system 114 thereof.

At step 202, the process 200 includes receiving a pill identification request 402. The pill identification request 402 includes one or more images 404 of a pill and a user identifier 406 of a user associated with the pill. In one embodiment, the images 404 of the pill include a first image 404A of a front side of the pill and/or a second image 404B of a back side of the pill. The user associated with the pill is one of the plurality of users having a health plan provided by the payer, and the user identifier 406 can be any type of identifying information unique to the user that the payer system 108 associates with the user. One example of the user identifier 406 is a member identifier of the user. In other examples, the user identifier 406 can be a combination of user information such as a name and a user date of birth.

At step 204, the process 200 includes generating one or more image embeddings based on the one or more images 404 received at step 202. The one or more image embeddings can be generated using the first machine learning system 112. The one or more image embeddings generated can be averaged image embeddings 418 for the one or more images 404. For example, each of the one or more images 404 is augmented to generate one or more augmented images 410, and a plurality of fine-tuned models 412 of the first machine learning system 112 generate one or more sets 414 of a plurality of image embeddings from the one or more augmented images 410. The plurality of image embeddings included within each of the one or more sets 414 are then averaged during a post-processing operation 416 to ultimately generate the one or more averaged image embeddings 418 for the one or more images 404.

As described in more detail in FIG. 3A, steps 302-308 of the process 300 of FIG. 3A perform at least a part of the step 204 of the process 200 of FIG. 2. For example, at step 302, the process 300 includes receiving the one or more images 404 of the pill that were included in the pill identification request 402. The one or more images 404 of the pill can include the first image 404A and the second image 404B. The one or more images 404 undergo one or more pre-processing operations, such as an augmentation process 408. For example, at step 304, the process 300 includes augmenting the one or more images 404 (e.g., by applying the augmentation process 408) to generate the one or more augmented images 410. The first image 404A and/or the second image 404B can be augmented to respectively generate an augmented first image 410A and/or an augmented second image 410B. Each of the one or more images 404 is augmented a predefined number of times to generate the one or more augmented images 410. As one, non-limiting example, each of the one or more images 404 is augmented 11 times to generate the one or more augmented images 410.

Example types of augmentations performed on the one or more images 404 include a random flip from left to right, random saturation, random contrast, and/or random brightness. The augmentations can be performed sequentially according to a predefined sequence. Additionally, performance of each augmentation in the sequence can be based on associated probabilities for the augmentations, where the associated probabilities are hyperparameters set for the plurality of fine-tuned models 412 executed by the first machine learning system 112. An example predefined sequence for the augmentations includes a repeating sequence of a random flip from left to right, random saturation, random contrast, and random brightness. When one of the one or more images 404 is being augmented according to the sequence, a first decision of whether a probability associated with the random flip from left to right is above a threshold is made. If the probability is above the threshold, the image is flipped from left to right to perform a first augmentation. Otherwise, the image is not augmented. Next, a second decision is made as to whether a probability associated with the saturation (e.g., the next augmentation in the sequence) is above a threshold. If the probability is above a threshold, the flipped image (or the original image if not previously augmented) is saturated to perform a second augmentation. Otherwise, second augmentation is not performed. The augmentation process 408 continues on in accordance with the sequence until the image has been augmented the predefined number of times, and is repeated for each of the one or more images 404.

At step 306, the process 300 includes generating, using the plurality of fine-tuned models 412 of the first machine learning system 112, the one or more sets 414 of the plurality of image embeddings for the one or more augmented images 410. For example, the one or more sets 414 can include a set of first image embeddings 414A generated by the plurality of fine-tuned models 412 based on the augmented first image 410A and/or a set of second image embeddings 414B generated by the plurality of fine-tuned models 412 based on the augmented second image 410B.

One image embedding from the plurality of image embeddings included in a given set of the one or more sets 414 is output from each fine-tuned model of the plurality of fine-tuned models 412. The image embedding is an output from a layer preceding a softmax function of the respective fine-tuned model from the plurality of fine-tuned models 412. In one non-limiting example, the first machine learning system 112 includes five fine-tuned models and thus, five image embeddings are output for each of the one or more augmented image 410 for inclusion in a given set of the one or more sets 414. The plurality of fine-tuned models 412 are pre-trained image classifiers that have been fine-tuned, as described in detail with reference to FIG. 5 below.

At step 308, the process 300 includes averaging the plurality image embeddings included within each of the one or more sets 414 to generate one or more averaged image embeddings 418. For example, the first image embeddings 414A included in one of the sets 414 are averaged to generate an averaged first image embedding 418A for the first image 404A and/or the second image embeddings 414B included in one of the sets 414 are averaged to generate an averaged second image embedding 418B for the second image 404B.

Returning to the process 200 of FIG. 2, at step 206, the process 200 includes retrieving, using the user identifier 406, claims data 428 for the user. The claims data 428 for the user includes medical claims data and/or pharmaceutical claims data. The medical claims data can include one or more claims indicating previous diagnoses and/or procedures associated with the user. The pharmaceutical claims data can include one or more claims indicating pill identifiers for medications previously prescribed to the user. The pill identifiers can be NDC codes.

In some examples, as part of a claims data retrieval process 420, a query 422 including the user identifier 406 is generated and transmitted directly and/or via the payer system 108 from the pill identification system 110 to one of the data storage systems 116 including a claims data store 424 (e.g., one of the data stores 118) that store claims data for the plurality of users of the payer system 108. As previously discussed, the claims data 428 for a given user of the plurality of users is stored in association with the user identifier 406, and thus the respective one of the data storage systems 116 can identify the claims data 428 for the user using the user identifier 406 and return the claims data 428 as query results 426 to the pill identification system 110 for use by the second machine learning system 114.

At step 208, the process 200 includes encoding the claims data 428 to generate a claims embedding 432 (e.g., via an encoding process 430). As part of the encoding process 430, one or more techniques can be used individually or in combination to encode the claims data 428. For example, multi-hot encoding, a latent dimension of an autoencoder, and/or dimension reduction techniques, such as principal component analysis (PCA), can be used to encode the claims data 428.

At step 210, the process 200 includes identifying the pill based on the one or more image embeddings (e.g., the one or more averaged image embeddings 418) and the claims embedding 432. The second machine learning system 114 can be used to identify the pill. As described in more detail in FIG. 3B, steps 312-318 of the process 310 of FIG. 3B perform at least a part of the step 210 of the process 200 of FIG. 2. For example, at step 312, the process 310 includes receiving the one or more averaged image embeddings 418 and the claims embedding 432. The one or more averaged image embeddings 418 are received from the first machine learning system 112, and can include the averaged first image embedding 418A generated by the first machine learning system 112 for the first image 404A and/or the averaged second image embedding 418B generated by the first machine learning system 112 for the second image 404B. The claims embedding 432 includes the claims data 428 encoded during the encoding process 430.

At step 314, the process 310 includes concatenating the one or more averaged image embeddings 418 and the claims embedding 432 to generate a concatenated embedding 436 (e.g., via a concatenation process 434).

At step 316, the process 310 includes generating, using a trained model 438 of the second machine learning system 114, a probability distribution 440 over a plurality of pill identifiers that indicates a likelihood the pill corresponds to each of the plurality of pill identifiers based on the concatenated embedding 436. In one embodiment, the trained model 438 of the second machine learning system 114 is a two layer feed-forward network, such as a multilayer perceptron (MLP). In some examples, the pill identifiers in the probability distribution 440 are NDC codes for corresponding pills. Therefore, the probability distribution 440 output by the trained model 438 includes a probability of each NDC code being the NDC code that the pill in the images corresponds to. For example, a first NDC code has a probability of 0.01, a second NDC code has a probability of 0.04, a third NDC code has a probability of 0.75, and so on, where the total value of the probabilities for each NDC code sums up to 1.

At step 318, the process 310 includes identifying the pill based on a pill identifier from the plurality of pill identifiers that the pill has a highest likelihood of corresponding to according to the probability distribution 440 (e.g., by performing one or more post-processing operations 442). As previously discussed, in some examples, the pill identifiers in the probability distribution 440 can be NDC codes for corresponding pills. Each NDC code indicates or identifies a formula, a dosage, and/or a form of the corresponding pill, among other information associated with the pill. Therefore, for the NDC code associated with the highest likelihood in the probability distribution 440, the formula, dosage, and/or form of the pill corresponding to the NDC code is identified. As one non-limiting example, NDC code 0777-4104-02 includes three code segments identifying a labeler (e.g., Dista Products), a product code (e.g., Prozac Capsules 20 mg), and a package code (e.g., 100 capsules in 1 bottle), respectively. The formula, dosage, and/or form of the pill can be identified from at least the product code segment by using a look-up database or other similar data structure including the NDC codes, where the identification is one of the post-processing operations 442.

In some examples, the post-processing operations 442 also include the application of one or more predefined thresholds. For example, a first predefined threshold (e.g., a predefined minimum value) can be applied to the pill identifier having the highest likelihood in the probability distribution 440. Additionally or alternatively, a second predefined threshold (e.g., a predefined minimum difference) can be applied to a difference between a first pill identifier having the highest likelihood and a second pill identifier having the next highest likelihood in the probability distribution 440. Among other things, the first and/or second predefined thresholds can be applied as part of the identification to determine a response type to generate in response to the pill identification request 402, as described in more detail below.

Returning to the process 200 of FIG. 2, at step 212, the process 200 includes generating a response 444 to the pill identification request 402 based on the identifying (e.g., via one of the post-processing operations 442). For example, the formula, dosage, and/or form of the pill identified using the pill identifier (e.g., the NDC code) can be included in the response 444. In addition to the type of the pill, the response 444 can include the one or more images 404 of the pill captured and/or links to additional information associated with the pill identified.

In some examples, if the pill identifier having the highest likelihood in the probability distribution 440 does not meet the first predefined threshold (e.g., is not above the predefined minimum value), the response 444 generated can instead include an error message. Additionally or alternatively, if a difference between the first pill identifier having the highest likelihood and the second pill identifier having the next highest likelihood is less than the second predefined threshold (e.g., is not the predefined minimum difference), the response 444 generated can include the error message. The error message can indicate the pill was unable to be identified. In some examples, the error message can prompt the requesting user to capture another set of one or more images (e.g., to submit another request). Additionally or alternatively, based on the context in which the pill identification request is submitted, the error message prompt can include other information. For example, if the requesting user is the user associated with the pill, the user can be prompted to contact their healthcare team.

The response 444 is transmitted to the requesting user device 102 via the application for display to the requesting user. The information included in the response 444 is displayed through a user interface of the application using audio, visual, and/or haptic techniques. An example user interface of the application is shown in FIG. 7.

In some examples the pill identified is provided as input to other processes. As one non-limiting example, the pill identified can be provided to another system that is configured to determine whether the particular type of the pill would adversely interact with any other pills or medications that the user is taking (e.g., based on prescriptions identified from the claims data 428 and/or other medical data of the user that is accessible by the payer system 108).

The above-described environment 100 and the processes 200, 300, and 310 for pill identification performed by one or more of the components thereof implement machine learning-based techniques to integrate tabular claims data of a user that is associated with a pill in conjunction with image data of the pill to identify the pill with improved accuracy. The processing of the claims data (e.g., in the form of the claims embedding 432 within the concatenated embedding 436) in conjunction with image data (e.g., in the form of the one or more averaged image embeddings 418 within the concatenated embedding 436) by the trained model 438 to identify the pill further informs and thus increases an accuracy of the pill identification process. For example, given a particular diagnosis or procedure, certain types of pills are typically prescribed. Therefore, diagnosis or procedure-related data encoded in the claims embedding 432 can be processed in conjunction with the one or more averaged image embeddings 418 to help differentiate between likely types of pills. Similarly, if the user was previously prescribed a type of pill based on a previous pharmaceutical claim, the previous prescription can increase a likelihood that the user has been prescribed this type of pill again or another type of pill that is typically prescribed in conjunction with or subsequently to the type of pill. Therefore, the pharmaceutical claims data encoded in the claims embedding can also be processed in conjunction with the one or more averaged image embeddings 418 to help differentiate. Additionally, a robusticity of the pill identification system 110 is further increased by the augmentation of the one or more images 404 by the first machine learning system 112 as part of the image embedding generation process to account for variations in lighting, background, and/or angles of image capture.

Accordingly, certain aspects of this disclosure include processes for pill identification. The processes 200, 300, and 310 described above are provided merely as examples, and can include additional, fewer, different, or differently arranged steps than depicted in FIGS. 2, 3A, and 3B, respectively.

Additionally, the processes 200, 300, and/or 310 described above with reference to FIGS. 2, 3A and/or 3B associated with pill identification can be implemented in a variety of use cases. Non-limiting exemplary use cases for performing pill identification are discussed in turn below.

In a patient use case, the requesting user is the user that is associated with the pill. For example, the requesting user is the patient who has been subscribed the pill by a healthcare provider and filled the subscription through a pharmacy. The patient can login to the application on the requesting user device 102 (e.g., by providing a username and password) to establish a session and select a pill identification feature of the application in order to confirm an identity of the pill in the user's possession. For example, upon selection of the pill identification feature, the patient is prompted to capture and submit the one or more images 404 as part of the pill identification request 402. The user identifier 406 can be automatically included in the pill identification request 402 by the application as the user identifier 406 is associated with the session established via the login credentials. The response 444 generated by the pill identification system 110 in response to the pill identification request 402 is then received and presented within a user interface of the application to allow the user to confirm and/or be confident in the type of the pill prior to consumption of the pill.

In a pharmacy use case, the requesting user is a pharmacy team member. In some examples, the pharmacy team member performs the pill identification process to verify that a prescription filled for the user associated with the pill includes the correct types of pills corresponding to the prescription. For example, the pharmacy team member can select the pill identification feature of the application executing on the requesting user device 102 to perform the verification. Upon selection of the pill identification feature, the pharmacy team member is prompted to capture and submit the one or more images 404 as part of the pill identification request 402. The pharmacy team member is also prompted to provide the user identifier 406 for the user associated with the pill as part of the pill identification request 402. The response 444 generated by the pill identification system 110 in response to the pill identification request 402 is then received and displayed within a user interface of the application to allow the pharmacy team member to verify the pill identified matches the prescription. In some examples, the prescription can also be included in the pill identification request 402, and an automatic verification process can be one of the post-processing operations 442 performed to compare the pill identified and the prescription, such that the response 444 further includes an indicator of a match or a mismatch.

Other example use cases include point of care and/or emergency response use cases. In a point of care use case, the requesting user can be a healthcare team member responsible for intake at a healthcare facility, such as an urgent care or a hospital. For example, in some instances, a patient or a caretaker of the patient brings pills or medications that the patient is taking to the healthcare facility, particularly when the patient has a large number of different medications. The healthcare team member can use the pill identification feature of the application to identify the different types of pills being taken by the patient in order to prevent double dosing of medications and/or avoid providing contraindicative medications to the patient while being cared for at the healthcare facility. In one example emergency response use case, the requesting user can be an EMT responding to a medical emergency, such as a suspected overdose. The EMT can use the pill identification feature of the application to identify types of pills that are found at the scene to determine how to best treat the overdose. In another example emergency response use case, the requesting user can be a law enforcement officer that identifies a bag of unlabeled pills as they are performing a search of the user's person, car, or home. The law enforcement officer can use the pill identification feature of the application to identity the types of the pills included in the bag to determine whether they are illegal or controlled substances for which the user does not have a prescription.

FIG. 5 is flow chart showing an example of a process 500 for fine-tuning the plurality of fine-tuned models 412 of the first machine learning system 112, according to some embodiments of the disclosure. The process 500 is provided merely as an example, and can include additional, fewer, different, or differently arranged aspects than depicted in FIG. 5. In some embodiments, the first machine learning system 112 performs the process 500 to fine-tune the plurality of fine-tuned models 412. In other embodiments, a system or device other than the first machine learning system 112 performs the process 500 to fine-tune the plurality of fine-tuned models 412. The plurality of fine-tuned models 412 are then provided to the first machine learning system 112 for execution.

At step 502, the process 500 includes receiving a pre-trained source model. In one embodiment, the pre-trained source model is an image classifier trained on a source dataset. One example trained image classifier is trained on an ImageNet dataset (e.g., MobileNet V1).

At step 504, the process 500 includes generating a target model based on the pre-trained source model. For example, model parameters of the pre-trained source model, except for an output layer, can be copied from the pre-trained source model to generate the target model based on the assumption that the model parameters contain knowledge learned from the source dataset and this knowledge will also be applicable to the target dataset for the target model.

At step 506, the process 500 includes receiving first training data. The first training data is a labeled pill image dataset that is the target dataset for the target model. The first training data includes a plurality of samples and corresponding labels. The samples include a plurality of sets of training images of pills of different types. For examples, each set includes a first training image of a front of the pill and a second training image of a back of the pill. The corresponding label for the set is a pill identifier label that identifies the pill included in the first and second training images, such as an NDC code. In some examples, the first training data is a publically available labeled pill image dataset that can be obtained from an external resource. In other examples, the first machine learning system 112 and/or another system or device collects and generates the first training data.

At step 508, the process 500 includes dividing the first training data into a plurality of folds to generate a plurality of first training data subsets. In some examples, the first training data is divided into N folds, where N is a number of models to be fine-tuned (e.g., a number of the plurality of fine-tuned models 412). Therefore, each of the N folds includes a first training data subset of the plurality of first training data subsets. To provide a non-limiting, illustrative example, where the first training data includes 100 samples and is divided into 5 folds to fine-tune 5 models (e.g., N is five), 95 samples are included in each fold to fine-tune one of the 5 models, where the specific 95 samples are different between each of the folds. A remaining 5 of the 10 samples are held out in each fold and are used to identify optimal parameters for each of the 5 models.

At step 510, the process 500 include generating, from the target model, the plurality of fine-tuned models 412 using the plurality of first training data subsets. Prior to generating the plurality of fine-tuned models 412, the training images (e.g., including both first and second training images) within each of the plurality first training data subsets undergo a plurality of augmentations. A number of the augmentations is predefined. As one, non-limiting example, each training image is augmented 11 times to generate an augmented training image. Example types of augmentations include a random flip from left to right, random saturation, random contrast, and/or random brightness.

The augmentations can be performed sequentially according to a predefined sequence. Additionally, performance of each augmentation in the sequence can be based on associated probabilities for the augmentations, where the associated probabilities are hyperparameters set for the target model. An example predefined sequence for the augmentations includes a repeating sequence of a random flip from left to right, random saturation, random contrast, and random brightness. For example, for a training image being augmented according to the sequence, a first decision of whether a probability associated with the random flip from left to right is above a threshold is made. If the probability is above the threshold, the training image is flipped from left to right to perform a first augmentation. Otherwise, the training image is not augmented. Next, a second decision is made as to whether a probability associated with the saturation (e.g., the next augmentation in the sequence) is above a threshold. If the probability is above a threshold, the flipped training image (or the original training image if not previously augmented) is saturated to perform a second augmentation. Otherwise, second augmentation is not performed. The augmentations continue on in accordance with the sequence until the predefined number of augmentations have been performed.

To generate one of the plurality of fine-tuned models 412 from the target model, the augmented training images within a given first training data subset for a fold are processed by the target model (or a copy of the target model) to fine-tune the target model for the respective fold. The above is repeated for the augmented training images within each of the given first training data subsets for the remaining N folds such that a number of the plurality of fine-tuned models 412 generated equals N.

Once fine-tuned, at step 512, the process 500 includes storing the plurality of fine-tuned models 412. For example, the fine-tuned models 412 are stored in one of data stores 118 for subsequent use. The fine-tuned models 412 are used for training the trained model 438 of the second machine learning system 114 and/or for deployment to perform one or more steps associated with the process 200 and/or the process 300 described above with reference to FIGS. 2 and 3A. In the subsequent training and/or deployment processes, an image embedding for an input image that is output from a layer preceding a softmax function of each respective fine-tuned model from the plurality of fine-tuned models 412 (e.g., forming one of the sets 414 of image embeddings) is used to generate one of the averaged image embeddings 418 across the plurality of fine-tuned models 412. The weights of the plurality of fine-tuned models 412 can be frozen or static.

FIG. 6 is a flow chart showing an example of a process 600 for training the trained model 438 of the second machine learning system 114, according to some embodiments of the disclosure. The process 600 is provided merely as an example, and can include additional, fewer, different, or differently arranged aspects than depicted in FIG. 6. In some embodiments, the second machine learning system 114 performs the process 600 to train the trained model 438. In other embodiments, a system or device other than the second machine learning system 114 performs the process 600 to train the trained model 438. The trained model 438 is then provided to the second machine learning system 114 for deployment. In some examples, the trained model 438 can be monitored upon deployment and updated and/or re-trained based on the monitoring to improve an accuracy of the trained model 438.

At step 602, the process 600 includes receiving second training data. The second training data includes a plurality samples and corresponding labels. Each sample includes one or more training images of a pill and training claims data of a user that includes a pill identifier corresponding to the pill in training images. The pill identifier can be an NDC code. In some examples, the training images include a set of first and second training images, where the first training image is of the front of the pill and the second training image is of the back of the pill. The corresponding label for each sample can include the pill identifier (e.g., the NDC code).

In some examples, the samples of the second training data are generated or curated by the second machine learning system 114. In other examples, another system or device is configured to generate or curate the samples of the second training data for provision to the second machine learning system 114. In one embodiment, the samples are generated using at least a portion of the first training data associated with the fine-tuning of the fine-tuned models 412 of the first machine learning system 112.

To provide an example curation process, the claims data of at least a subset of the plurality of users having health plans provided by the payer associated with the payer system 108 include one or more claims with one or more NDC codes or other similar pill identifiers. For each claim (or for each NDC code if more than one in the claim) per user in the subset of the plurality of users, a sample for the second training data is curated. To curate the sample for a given claim, one or more training images for the pill that are labeled with a same pill identifier or NDC code that is included in the claim are identified from the first training data (e.g., from the labeled pill image dataset). In some examples, the training images identified include a pair or set of first and second training images of a front and a back of the pill respectively. A portion of the claims data of the user (e.g., training claims data) is then associated with the identified training images. The training claims data is a portion of the claims data of the user that is associated with a date or time period prior to the date of the claim having the NDC code. As previously discussed, the claims data of the user includes previous diagnoses, previous procedures, and previous pharmaceutical claims.

One or more operations are then performed on the associated training images and training claims data to generate specific input associated with the samples for provision to the model 438 during a training process. For example, for each of the plurality of samples, one or more training image embeddings are received from the first machine learning system 112 that are generated based on the one or more training images in the respective sample. The training image embeddings are generated using the plurality of fine-tuned models 412 of the first machine learning model. For example, the training images in the respective sample include the first and second training images of the front and the back of the pill respectively. The first training image is augmented the predefined number of times to generate an augmented first training image that is fed through each of the plurality of fine-tuned models 412 to receive, as output, a first set of a plurality of training image embeddings that are averaged to generate a first averaged training image embedding for the first training image. Similarly, the second training image is augmented the predefined number of times to generate an augmented second training image that is fed through each of the plurality of fine-tuned models 412 to receive, as output, a second set of a plurality of training image embeddings that are averaged to generate a second averaged training image embedding for the second training image.

Additionally, for each of the plurality of samples, the training claims data is encoded to generate a training claims embedding. One or more techniques can be used individually or in combination to encode the training claims data. For example, multi-hot encoding, a latent dimension of an autoencoder and/or dimension reduction techniques, such as principal component analysis (PCA), can be used to encode the training claims data.

In some examples, the one or more training embeddings received from the first machine learning system 112 (e.g., the averaged training embeddings) and the training claims embedding for each sample are then concatenated or otherwise joined to generate a training concatenated embedding for the respective sample that is provided as input to the model 438 for the training at step 604.

At step 604, the process 600 includes training the model 438 based on at least a portion of the plurality of samples to output a probability distribution over a plurality of pill identifiers indicating a likelihood a pill included in an image corresponds to each of the plurality of pill identifiers. In some examples, another portion of the samples are withheld to test and/or validate the trained model 438.

In one embodiment, the trained model 438 is a two-layer feed-forward network, such as two-layer MLP. For training, the training concatenated embeddings for at least the portion of the samples included in the second training data are provided as inputs to a training process to generate (e.g., build) the trained model 438. Generally, a model includes a set of variables, e.g., nodes, neurons, filters, etc., that are tuned, e.g., weighted or biased, to different values via the application of the second training data.

In some examples, the training process employs supervised learning processes to train the model (e.g., to generate the trained model 438). When supervised learning processes are employed, labels corresponding to the samples, such as the above-described pill identifier or NDC code, facilitate the learning process by providing a ground truth. Training proceeds by feeding the concatenated training image embedding included in one of samples into the model, the model having variables set at initialized values, e.g., at random, based on Gaussian noise, a pre-trained model, or the like. The model outputs a predicted probability distribution over the plurality of pill identifiers that indicates a likelihood that a pill included in the training images associated with the sample (e.g., the training images from which the training image embeddings included in the concatenated image embedding are generated based on) corresponds to each of the pill identifiers based on the training images and the claims data.

The output is compared with the corresponding label for the sample (e.g., the ground truth) that indicates the actual pill identifier for the pill to determine an error, which is then back-propagated through the model to adjust the values of the variables. This process is repeated for at least the portion of the samples until a determined loss or error is below a predefined threshold. In some examples, the other portions of the samples included in the second training data that are withheld are then used to further validate or test the trained model 438.

In other examples, unsupervised, semi-supervised, and/or reinforcement learning processes can be employed to train the model. For unsupervised learning processes, the samples do not include pre-assigned labels to aid the learning process. Rather, unsupervised learning processes include clustering, classification, or the like to identify naturally occurring patterns in the samples. Supervised or unsupervised K-means clustering or K-Nearest Neighbors can also be used. Combinations of K-Nearest Neighbors and an unsupervised cluster technique can also be used. For semi-supervised learning, a combination of samples with pre-assigned labels or scores and samples without pre-assigned labels are used to train the model. When reinforcement learning is employed, an agent (e.g., an algorithm) is trained to make a decision regarding the probability distribution through trial and error. For example, upon making a decision, the agent then receives feedback (e.g., a positive reward if the pill identifier associated with the highest likelihood in the probability distribution aligns with the pill included in the image), adjust its next decision to maximize the reward, and repeat until a loss function is optimized.

Once trained, at step 606, the process 600 includes storing the trained model 438 for subsequent use. For example, the trained model 438 is stored in one of data stores 118. The trained model 438 is then retrieved and subsequently deployed (e.g., executed) by the second machine learning system 114 to perform one or more steps associated with the process 200 and/or the process 310 described above with reference to FIGS. 2 and 3B. Optionally, when the trained model 438 is deployed, feedback associated with one or more outputs of the trained model 438 (e.g., an identified pill type associated with a pill identifier having the highest likelihood in the probability distribution) is received. For example, in one embodiment, medical professionals can provide, as feedback, the actual types of the pills included in the images 404 that are received as part of pill identification requests 402. The feedback is analyzed along with the corresponding output of the trained model 438 to determine an accuracy of the probability distributions 440. The trained model 438 can then be re-trained, modified, or otherwise updated based on the feedback (e.g., the feedback serves as labels for new samples for training). For example, the value of one or more variables of the trained model 438 are adjusted. In some examples, the trained model 438 is retrained after a predefined number of new training datasets have been received.

FIG. 7 is an example user interface 700 displaying the response 444 to the pill identification request 402, according to some embodiments of the disclosure. The user interface 700 is a user interface of the application that is executing on the requesting user device 102. The response 444 displayed on the user interface 700 includes pill information 702 associated with the pill identified by the pill identification system 110. For example, the pill information 702 can include a formula 704, dosage 706, and/or form 708 of the pill that is identified using the pill identifier (e.g., NDC code) associated with the highest likelihood in the probability distribution 440. The response 444 can include the images 404 of the pill captured, such as the first image 404A of the front of the pill and the second image 404B of the back of the pill. The response 444 can further include a link 710 to additional information associated with the pill identified. Additionally or alternatively, the user interface 700 can audibly present at least the pill information 702, among other information within the response 444 (e.g., using text-to-speech techniques).

The user interface 700 described above is provided merely as an example, and may include additional, fewer, different, or differently arranged information and/or interactive control elements than depicted in FIG. 7.

In general, any process or operation discussed in this disclosure that is understood to be computer-implementable can be performed by one or more processors of a computer system as described herein. A process or process step performed by one or more processors is also referred to as an operation. The one or more processors are configured to perform such processes by having access to instructions (e.g., software or computer-readable code) that, when executed by the one or more processors, cause the one or more processors to perform the processes. The instructions are stored in a memory of the computer system. A processor can be a central processing unit (CPU), a graphics processing unit (GPU), or any suitable types of processing unit.

A computer system, such as a system or device implementing a process or operation in the examples above, includes one or more computing devices. One or more processors of a computer system can be included in a single computing device or distributed among a plurality of computing devices. One or more processors of a computer system can be connected to a data storage device. A memory of the computer system includes the respective memory of each computing device of the plurality of computing devices.

Figure 8:
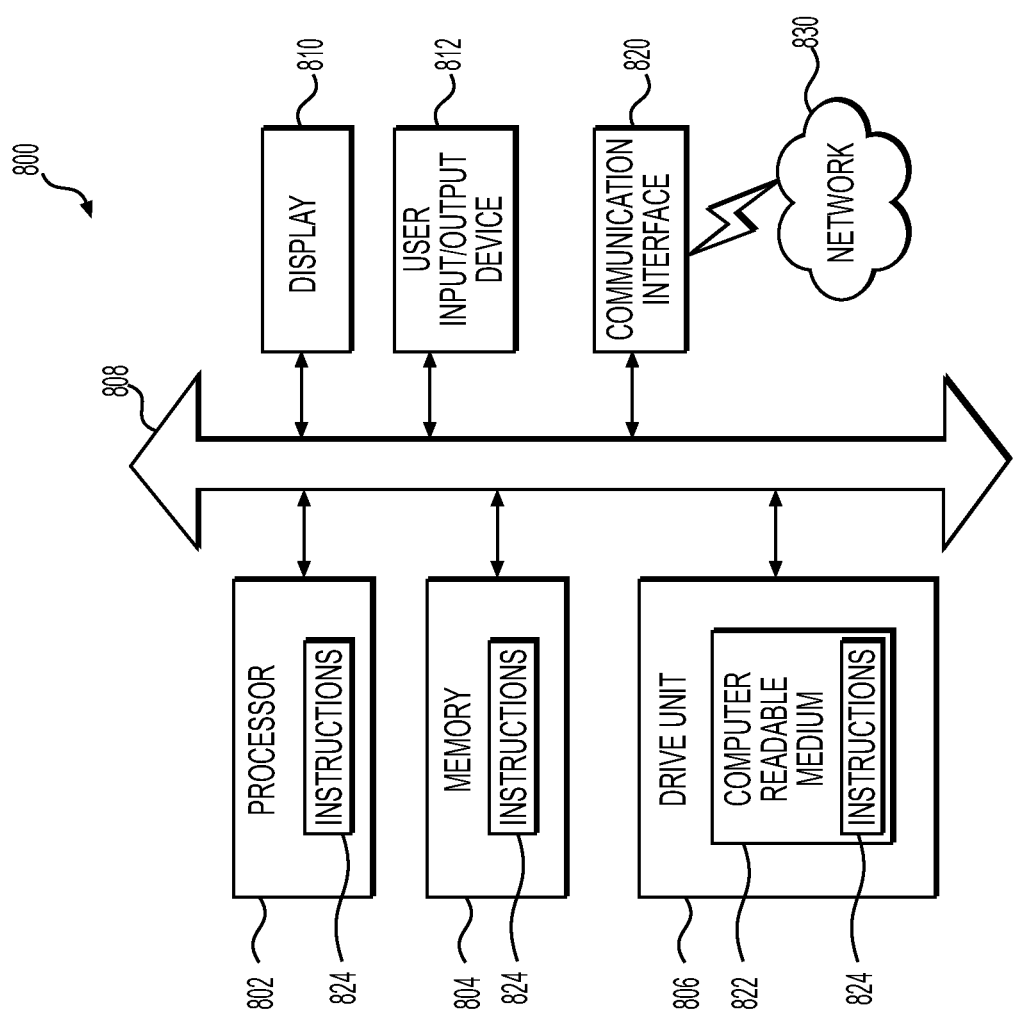
FIG. 8 shows an implementation of a computer system that executes techniques presented herein, according to some embodiments of the disclosure.

FIG. 8 shows an implementation of a computer system 800 that executes techniques presented herein, according to some embodiments of the disclosure. The computer system 800 can include a set of instructions that can be executed to cause the computer system 800 to perform any one or more of the methods or computer-based functions disclosed herein. The computer system 800 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 800 operates in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while the computer system 800 is illustrated as a single system, the term "system" shall also be taken to include any collection of systems or sub-systems that individually or jointly execute a set, or multiple sets, of instructions to perform one or more computer functions.

As illustrated in FIG. 8, the computer system 800 includes a processor 802, e.g., a central processing unit (CPU), a graphics processing unit (GPU), or both. The processor 802 can be a component in a variety of systems. For example, the processor 802 is part of a standard personal computer or a workstation. The processor 802 is one or more processors, digital signal processors, application specific integrated circuits, field programmable gate arrays, servers, networks, digital circuits, analog circuits, combinations thereof, or other now known or later developed devices for analyzing and processing data. The processor 802 implements a software program, such as code generated manually (e.g., programmed).

The computer system 800 includes a memory 804 that can communicate via a bus 808. The memory 804 is a main memory, a static memory, or a dynamic memory. The memory 804 includes, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one implementation, the memory 804 includes a cache or random-access memory for the processor 802. In alternative implementations, the memory 804 is separate from the processor 802, such as a cache memory of a processor, the system memory, or other memory. The memory 804 can be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein are performed by the processor 802 executing the instructions stored in the memory 804. The functions, acts or tasks are independent of the particular type of instructions set, storage media, processor or processing strategy and are performed by software, hardware, integrated circuits, firm-ware, micro-code and the like, operating alone or in combination. Likewise, processing strategies can include multiprocessing, multitasking, parallel processing, and the like.

As shown, the computer system 800 further included a display 810, such as a liquid crystal display (LCD), an organic light emitting diode (OLED), a flat panel display, a solid-state display, a cathode ray tube (CRT), a projector, a printer or other now known or later developed display device for outputting determined information. The display 810 acts as an interface for the user to see the functioning of the processor 802, or specifically as an interface with the software stored in the memory 804 or in a drive unit 806.

Additionally or alternatively, the computer system 800 includes an input/output device 812 configured to allow a user to interact with any of the components of the computer system 800. The input/output device 812 is a number pad, a keyboard, or a cursor control device, such as a mouse, or a joystick, touch screen display, remote control, or any other device operative to interact with the computer system 800.

The computer system 800 also or alternatively includes the drive unit 806 implemented as a disk or optical drive. The drive unit 806 includes a computer-readable medium 822 in which one or more sets of instructions 824, e.g., software, can be embedded. Further, the sets of instructions 824 embody one or more of the methods or logic as described herein. The instructions 824 reside completely or partially within the memory 804 and/or within the processor 802 during execution by the computer system 800. The memory 804 and the processor 802 can also include computer-readable media as discussed above.

In some systems, the computer-readable medium 822 includes the sets of instructions 824 or receives and executes the sets of instructions 824 responsive to a propagated signal so that a device connected to a network 830 can communicate voice, video, audio, images, or any other data over the network 830. Further, the sets of instructions 824 are transmitted or received over the network 830 via a communication port or interface 820, and/or using the bus 808. The communication port or interface 820 is a part of the processor 802 or is a separate component. The communication port or interface 820 is created in software or is a physical connection in hardware. The communication port or interface 820 are configured to connect with the network 830, external media, the display 810, or any other components in the computer system 800, or combinations thereof. The connection with the network 830 is a physical connection, such as a wired Ethernet connection or is established wirelessly as discussed below. Likewise, the additional connections with other components of the computer system 800 are physical connections or are established wirelessly. The network 830 is alternatively directly connected to the bus 808.

While the computer-readable medium 822 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that cause a computer system to perform any one or more of the methods or operations disclosed herein. In some examples, the computer-readable medium 822 is non-transitory, and is tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives are considered a distribution medium that is a tangible storage medium. Accordingly, the disclosure is considered to include any one or more of a computer-readable medium or a distribution medium and other equivalents and successor media, in which data or instructions are storable.

In an alternative implementation, dedicated hardware implementations, such as application specific integrated circuits, programmable logic arrays and other hardware devices, can be constructed to implement one or more of the methods described herein. Applications that include the apparatus and systems of various implementations can broadly include a variety of electronic and computer systems. One or more implementations described herein implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 is connected to the network 830. The network 830 defines one or more networks including wired or wireless networks, such as the network 104 described in FIG. 1. The wireless network can be a cellular telephone network, an 802.11, 802.18, 802.20, or WiMAX network. Further, such networks include a public network, such as the Internet, a private network, such as an intranet, or combinations thereof, and utilize a variety of networking protocols now available or later developed including, but not limited to TCP/IP based networking protocols. The network 830 can include wide area networks (WAN), such as the Internet, local area networks (LAN), campus area networks, metropolitan area networks, a direct connection such as through a Universal Serial Bus (USB) port, or any other networks that allow for data communication. The network 830 is configured to couple one computing device to another computing device to enable communication of data between the devices. The network 830 generally is enabled to employ any form of machine-readable media for communicating information from one device to another. The network 830 includes communication methods by which information may travel between computing devices. The network 830 can be divided into sub-networks. The sub-networks allow access to all of the other components connected thereto or the sub-networks restrict access between the components. The network 830 can be regarded as a public or private network connection and can include, for example, a virtual private network or an encryption or other security mechanism employed over the public Internet, or the like.

In accordance with various implementations of the present disclosure, the methods described herein are implemented by software programs executable by a computer system. Further, in one example, non-limited implementation, implementations can include distributed processing, component/object distributed processing, and parallel processing. Alternatively, virtual computer system processing can be constructed to implement one or more of the methods or functionalities as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure is implementable using any appropriate techniques for implementing the functionality described herein. The disclosure is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention can be practiced without these specific details. In other instances, well-known methods, structures, and techniques have not been shown in detail in order not to obscure an understanding of this description.

Thus, while there has been described what are believed to be the preferred embodiments of the invention, those skilled in the art will recognize that other and further modifications can be made thereto without departing from the spirit of the invention, and it is intended to claim all such changes and modifications as falling within the scope of the invention. For example, any formulas given above are merely representative of procedures that can be used. Functionality can be added or deleted from the block diagrams and operations are interchangeable among functional blocks. Steps can be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure further relates to the following aspects.

Example 1. A method for identifying pills performed by one or more processors, the method including: receiving a pill identification request including one or more images of a pill and an identifier of a user associated with the pill; generating one or more image embeddings based on the one or more images; retrieving, using the identifier of the user, claims data for the user; encoding the claims data to generate a claims embedding; identifying the pill based on the one or more image embeddings and the claims embedding; and generating and transmitting a response to the pill identification request based on the identifying.

Example 2. The method of example 1, wherein the one or more image embeddings are generated using a first machine learning system including a plurality of fine-tuned models, and generating the one or more image embeddings includes: augmenting the one or more images to generate one or more augmented images; generating, using the plurality of fine-tuned models, one or more sets of a plurality of image embeddings for the one or more augmented images; and averaging the plurality of image embeddings within each of the one or more sets to generate the one or more image embeddings.

Example 3. The method of example 2, wherein augmenting each of the one or more images includes: sequentially augmenting each of the one or more images a predefined number of times based on a predefined sequence of augmentation types.

Example 4. The method of any of the preceding examples, wherein the pill is identified using a second machine learning system including a trained model, and identifying the pill includes: concatenating the one or more image embeddings and the claims embedding to generate a concatenated embedding; generating, using the trained model, a probability distribution over a plurality of pill identifiers indicating a likelihood the pill corresponds to each of the plurality of pill identifiers based on the concatenated embedding; and identifying the pill based on a pill identifier from the plurality of pill identifiers that the pill has a highest likelihood of corresponding to based on the probability distribution.

Example 5. The method of claim 4, further including: determining the likelihood of the pill corresponding to the pill identifier is above a predefined threshold.

Example 6. The method of claim 4, wherein the pill identifier is a code that indicates a formula, a dosage, and a form of the pill.

Example 7. The method of claim 6, wherein generating the response includes: including one or more of the formula, the dosage, or the form of the pill in the response.

Example 8. The method of any of the preceding examples, wherein the claims data includes one or more diagnoses, one or more procedures, or one or more pharmaceutical claims associated with the user.

Example 9. The method of any of the preceding examples, wherein encoding the claims data includes: using at least one of multi-hot encoding, a latent dimension of an autoencoder, or a dimension reduction technique to encode the claims data.

Example 10. The method of any of the preceding examples, wherein the one or more image embeddings are generated using a first machine learning system including a plurality of fine-tuned models, and the plurality of fine-tuned models are generated by: receiving a pre-trained source model; generating a target model based on the pre-trained source model; receiving, as first training data, a plurality of samples and corresponding labels, wherein each sample of the plurality of samples includes one or more training images of a pill and a respective corresponding label includes a pill identifier for the pill; dividing the first training data into a plurality of folds to generate a plurality of first training data subsets; and generating, from the target model, each of the plurality of fine-tuned models using one of the plurality of first training data subsets.

Example 11. The method of any of the preceding examples, wherein the pill is identified using a second machine learning system including a trained model, and the trained model is generated by: receiving, as second training data, a plurality data for a user having a pill identifier corresponding to the pill, and a respective corresponding label includes the pill identifier for the pill; and training a model based on at least a portion of the plurality of samples and corresponding labels to output a probability distribution over a plurality of pill identifiers indicating a likelihood a pill included in an image corresponds to each of the plurality of pill identifiers.

Example 12. The method of any of the preceding examples, wherein: the one or more images of the pill include a first image of a front side of the pill and a second image of a back side of the pill, and the one or more image embeddings include a first image embedding generated based on the first image and a second image embedding generated based on the second image.

Example 13. A system for pill identification, the system including: one or more processors; and at least one memory storing instructions that, when executed by the one or more processors, cause the one or more processors to perform operations including: receiving a pill identification request including one or more images of a pill and an identifier of a user associated with the pill; generating one or more image embeddings based on the one or more images; retrieving, using the identifier of the user, claims data for the user; encoding the claims data to generate a claims embedding; identifying the pill based on the one or more image embeddings and the claims embedding; and generating and transmitting a response to the pill identification request based on the identifying.

Example 14. The system of example 13, wherein the one or more image embeddings are generated using a first machine learning system including a plurality of fine-tuned models, and generating the one or more image embeddings includes: augmenting the one or more images to generate one or more augmented images; generating, using the plurality of fine-tuned models, one or more sets of a plurality of image embeddings for the one or more augmented images; and averaging the plurality of image embeddings within each of the one or more sets to generate the one or more image embeddings.

Example 15. The system of example 13 or 14, wherein the pill is identified using a second machine learning system including a trained model, and identifying the pill includes: concatenating the one or more image embeddings and the claims embedding to generate a concatenated embedding; generating, using the trained model, a probability distribution over a plurality of pill identifiers indicating a likelihood the pill corresponds to each of the plurality of pill identifiers based on the concatenated embedding; and identifying the pill based on a pill identifier from the plurality of pill identifiers that the pill has a highest likelihood of corresponding to based on the probability distribution.

Example 16. The system of example 15, wherein the pill identifier is a code that indicates a formula, a dosage, and a form of the pill, and generating the response includes: including one or more of the formula, the dosage, or the form of the pill in the response.

Example 17. The system of any of examples 13-16, wherein the claims data includes one or more diagnoses, one or more procedures, or one or more pharmaceutical claims associated with the user.

Example 18. The system of any of examples 13-17, wherein encoding the claims data includes: using at least one of multi-hot encoding, a latent dimension of an autoencoder, or a dimension reduction technique to encode the claims data.

Example 19. The system of any of examples 13-18, wherein the one or more images of the pill include a first image of a front side of the pill and a second image of a back side of the pill, and the one or more image embeddings include a first image embedding generated based on the first image and a second image embedding generated based on the second image.

Example 20. A non-transitory computer readable medium for identifying pills, the non-transitory computer readable medium storing instructions which, when executed by one or more processors, cause the one or more processors to perform operations including: receiving a pill identification request including one or more images of a pill and an identifier of a user associated with the pill; generating one or more image embeddings based on the one or more images; retrieving, using the identifier of the user, claims data for the user; encoding the claims data to generate a claims embedding; identifying the pill based on the one or more image embeddings and the claims embedding; and generating and transmitting a response to the pill identification request based on the identifying.

What is claimed is:

1. A method for identifying pills performed by one or more processors, the method comprising:
receiving a pill identification request including one or more images of a pill and an identifier of a user associated with the pill;
generating one or more image embeddings based on the one or more images;
retrieving, using the identifier of the user, claims data for the user;
encoding the claims data to generate a claims embedding;
identifying the pill based on the one or more image embeddings and the claims embedding; and
generating and transmitting a response to the pill identification request based on the identifying.

2. The method of claim 1, wherein the one or more image embeddings are generated using a first machine learning system including a plurality of fine-tuned models, and generating the one or more image embeddings comprises:
augmenting the one or more images to generate one or more augmented images;
generating, using the plurality of fine-tuned models, one or more sets of a plurality of image embeddings for the one or more augmented images; and
averaging the plurality of image embeddings within each of the one or more sets to generate the one or more image embeddings.

3. The method of claim 2, wherein augmenting each of the one or more images comprises:
sequentially augmenting each of the one or more images a predefined number of times based on a predefined sequence of augmentation types.

4. The method of claim 1, wherein the pill is identified using a second machine learning system including a trained model, and identifying the pill comprises:
concatenating the one or more image embeddings and the claims embedding to generate a concatenated embedding;
generating, using the trained model, a probability distribution over a plurality of pill identifiers indicating a likelihood the pill corresponds to each of the plurality of pill identifiers based on the concatenated embedding; and
identifying the pill based on a pill identifier from the plurality of pill identifiers that the pill has a highest likelihood of corresponding to based on the probability distribution.

5. The method of claim 4, further comprising:
determining the likelihood of the pill corresponding to the pill identifier is above a predefined threshold.

6. The method of claim 4, wherein the pill identifier is a code that indicates a formula, a dosage, and a form of the pill.

7. The method of claim 6, generating the response comprises:
including one or more of the formula, the dosage, or the form of the pill in the response.

8. The method of claim 1, wherein the claims data includes one or more diagnoses, one or more procedures, or one or more pharmaceutical claims associated with the user.

9. The method of claim 1, wherein encoding the claims data comprises:
using at least one of multi-hot encoding, a latent dimension of an autoencoder, or a dimension reduction technique to encode the claims data.

10. The method of claim 1, wherein the one or more image embeddings are generated using a first machine learning system including a plurality of fine-tuned models, and the plurality of fine-tuned models are generated by:
receiving a pre-trained source model;
generating a target model based on the pre-trained source model;

receiving, as first training data, a plurality of samples and corresponding labels, wherein each sample of the plurality of samples includes one or more training images of a pill and a respective corresponding label includes a pill identifier for the pill;

dividing the first training data into a plurality of folds to generate a plurality of first training data subsets; and generating, from the target model, each of the plurality of fine-tuned models using one of the plurality of first training data subsets.

11. The method of claim 1, wherein the pill is identified using a second machine learning system including a trained model, and the trained model is generated by:

receiving, as second training data, a plurality of samples and corresponding labels, wherein each sample of the plurality of samples includes one or more training images of a pill and training claims data for a user having a pill identifier corresponding to the pill, and a respective corresponding label includes the pill identifier for the pill; and training a model based on at least a portion of the plurality of samples and corresponding labels to output a probability distribution over a plurality of pill identifiers indicating a likelihood a pill included in an image corresponds to each of the plurality of pill identifiers.

12. The method of claim 1, wherein:

the one or more images of the pill include a first image of a front side of the pill and a second image of a back side of the pill, and the one or more image embeddings include a first image embedding generated based on the first image and a second image embedding generated based on the second image.

13. A system for pill identification, the system comprising:

one or more processors; and at least one memory storing instructions that, when executed by the one or more processors, cause the one or more processors to perform operations including:

receiving a pill identification request including one or more images of a pill and an identifier of a user associated with the pill;

generating one or more image embeddings based on the one or more images;

retrieving, using the identifier of the user, claims data for the user;

encoding the claims data to generate a claims embedding;

identifying the pill based on the one or more image embeddings and the claims embedding; and generating and transmitting a response to the pill identification request based on the identifying.

14. The system of claim 13, wherein the one or more image embeddings are generated using a first machine learning system including a plurality of fine-tuned models, and generating the one or more image embeddings includes:

augmenting the one or more images to generate one or more augmented images;

generating, using the plurality of fine-tuned models, one or more sets of a plurality of image embeddings for the one or more augmented images; and averaging the plurality of image embeddings within each of the one or more sets to generate the one or more image embeddings.

15. The system of claim 13, wherein the pill is identified using a second machine learning system including a trained model, and identifying the pill comprises:

concatenating the one or more image embeddings and the claims embedding to generate a concatenated embedding;

generating, using the trained model, a probability distribution over a plurality of pill identifiers indicating a likelihood the pill corresponds to each of the plurality of pill identifiers based on the concatenated embedding; and identifying the pill based on a pill identifier from the plurality of pill identifiers that the pill has a highest likelihood of corresponding to based on the probability distribution.

16. The system of claim 15, wherein the pill identifier is a code that indicates a formula, a dosage, and a form of the pill, and generating the response includes:

including one or more of the formula, the dosage, or the form of the pill in the response.

17. The system of claim 13, wherein the claims data includes one or more diagnoses, one or more procedures, or one or more pharmaceutical claims associated with the user.

18. The system of claim 13, wherein encoding the claims data includes:

using at least one of multi-hot encoding, a latent dimension of an autoencoder, or a dimension reduction technique to encode the claims data.

19. The system of claim 13, wherein:

the one or more images of the pill include a first image of a front side of the pill and a second image of a back side of the pill, and the one or more image embeddings include a first image embedding generated based on the first image and a second image embedding generated based on the second image.

20. A non-transitory computer readable medium for identifying pills, the non-transitory computer readable medium storing instructions which, when executed by one or more processors, cause the one or more processors to perform operations comprising:

receiving a pill identification request including one or more images of a pill and an identifier of a user associated with the pill;

generating one or more image embeddings based on the one or more images;

retrieving, using the identifier of the user, claims data for the user;

encoding the claims data to generate a claims embedding;

identifying the pill based on the one or more image embeddings and the claims embedding; and generating and transmitting a response to the pill identification request based on the identifying.

* * * * *